United States Patent [19]

Houston et al.

[11] 4,082,606

[45] * Apr. 4, 1978

[54] EVAPORATION APPARATUS

[75] Inventors: James E. Houston, Grand Island, N.Y.; Reynard W. Gingrich, Fort Erie, Canada; Earl A. Schilt, Kenmore, N.Y.

[73] Assignee: Hooker Chemicals & Plastics Corporation, Niagara Falls, N.Y.

[*] Notice: The portion of the term of this patent subsequent to Aug. 24, 1993, has been disclaimed.

[21] Appl. No.: 624,139

[22] Filed: Oct. 20, 1975

Related U.S. Application Data

[63] Continuation of Ser. No. 429,999, Jan. 2, 1974, abandoned.

[51] Int. Cl.$^2$ .............................................. B01D 1/06
[52] U.S. Cl. ................... 159/27 B; 159/31; 23/273 R; 159/1 C; 165/108
[58] Field of Search .................. 159/1 C, 27 B, 28 A, 159/31, 14; 165/108

[56] References Cited

U.S. PATENT DOCUMENTS

| 351,795 | 11/1886 | Rice | 159/27 B |
|---|---|---|---|
| 521,974 | 6/1894 | Cooper | 159/26 R |
| 1,028,737 | 6/1912 | Kestner | 159/14 |
| 2,512,938 | 6/1950 | Henszey | 159/31 X |
| 2,764,233 | 9/1956 | Skinner | 159/27 B |
| 2,800,307 | 7/1957 | Putney | 159/1 C |
| 2,993,884 | 6/1961 | Nilan | 159/27 B |
| 2,998,060 | 8/1961 | Eckstrom | 159/27 A |
| 3,056,831 | 10/1962 | Stratford | 159/1 C |
| 3,976,430 | 8/1976 | Houston et al. | 159/1 C |

FOREIGN PATENT DOCUMENTS

| 413,640 | 5/1925 | Germany | 159/27 B |
|---|---|---|---|
| 938,960 | 2/1956 | Germany | 159/27 B |
| 37-14317 | 9/1962 | Japan | 159/31 |
| 13,005 of | 1911 | United Kingdom | 159/45 |

Primary Examiner—Norman Yudkoff
Attorney, Agent, or Firm—Peter F. Casella; Howard M. Ellis

[57] ABSTRACT

An integral forced circulation evaporator apparatus which comprises an evaporating chamber, providing therein a liquid space and a vapor space, a heating zone containing vertically disposed heat exchange tubes, and a liquid receiving chamber, said evaporating chamber being surmounted on said heating zone, in direct communication with the upper ends of said heat exchange tubes, said liquid receiving chamber being surmounted by said heating zone, in direct communication with the lower ends of said heat exchange tubes; pump means horizontally disposed within said liquid receiving chamber for the circulation of liquid through said evaporator apparatus, partition means disposed within said liquid receiving chamber so as to form, within said liquid receiving chamber, a first section containing the intake side of said pump means and a second section containing the discharge side of said pump means, said partition means further being positioned such that the lower ends of a portion of the heat exchange tubes are in direct communication with only that section containing the intake side of the pump means and the lower ends of the remaining heat exchange tubes are in direct communication with only that section containing the discharge side of the pump means, and a second partition means disposed within said evaporating chamber and positioned so as to form, within said evaporating chamber, a first section in direct communication with the upper ends of those heat exchange tubes whose lower ends are in direct communication with the intake side of the pump means and a second section in direct communication with the upper ends of those heat exchange tubes whose lower ends are in direct communication with the discharge side of the pump means, said second partition means being formed so as to prevent liquid flow between said sections in the evaporating chamber at a point immediately adjacent the upper ends of said heat exchange tubes while permitting liquid flow between said sections at a point removed from the upper ends of said heat exchange tubes, and further being positioned so that it is not above the level of the liquid in the evaporating chamber.

5 Claims, 5 Drawing Figures

EVAPORATION APPARATUS

This is a continuation, of application Ser. No. 429,999, filed Jan. 2, 1974, now abandoned.

This invention relates to a new and improved evaporation apparatus and, more particularly, it relates to an improved evaporation apparatus of the integral, forced circulation type, which is particularly useful for the concentration of crystallizing liquids, such as the caustic catholyte liquor from an electrolytic diaphragm cell.

Frequently, the processing of various chemicals involves the evaporation of solutions or slurries of these chemicals in order to obtain them in a more marketable form. By such treatments, the solutions or slurries are concentrated and a purification is effected by the crystallization of either impurities or of the desired product.

Depending upon the nature of the materials being processed, various different types of evaporators have been utilized. Thus, for example, with materials such as the caustic catholyte solutions from electrolytic diaphragm cells, evaporators of the forced circulation type have been found to be particularly suitable.

As a result of the particular adaptability of forced circulation evaporators for these types of solutions, numerous designs and configurations heretofore have been proposed for evaporators of this type. Generally, however, these have been somewhat large and complex in construction. As a consequence, not only have the initial manufacturing costs been high, but, additionally, installation, operation and maintenance cost, as well.

It is, therefore, an object of the present invention to provide an improved evaporation apparatus, suitable for use with crystallizing liquids, of the integral forced circulation type.

A further object of the present invention is to provide an improved, integral, forced circulation evaporator having a compact, simple design which will operate efficiently and economically over a wide range of operating conditions.

These and other objects will become apparent to those skilled in the art from the description of the invention which follows.

In the drawings which are attached hereto and form a part hereof,

Figure 1:
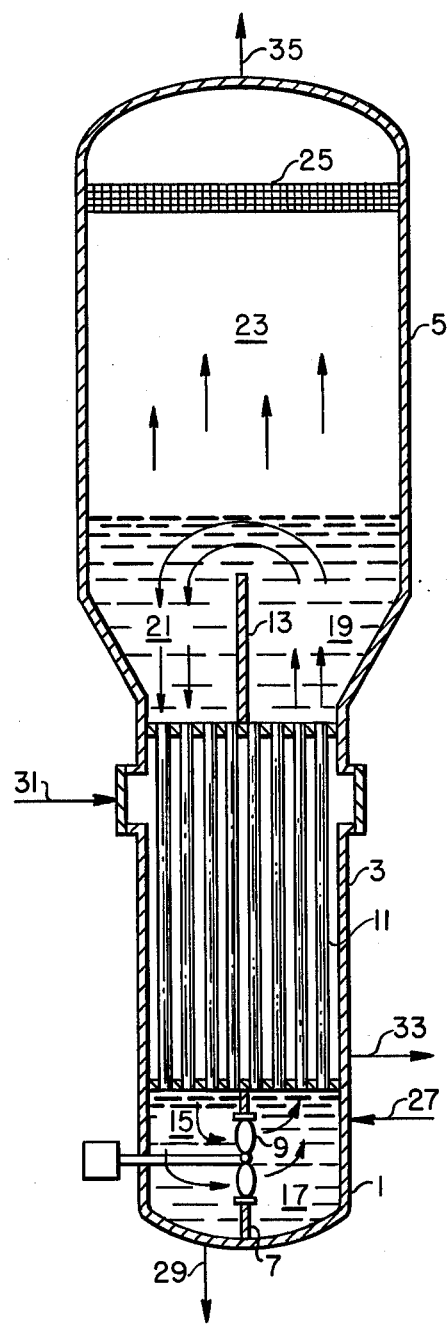
FIG. 1 is a vertical section of an evaporator apparatus of the present invention.

Pursuant to the above objects, the present invention includes an integral forced circulation evaporator apparatus which comprises an evaporating chamber, providing therein a liquid space and a vapor space, a heating zone containing vertically disposed heat exchange tubes and a liquid receiving chamber, said evaporating chamber being surmounted on said heating zone in direct communication with the upper ends of said heat exchange tubes, said liquid receiving chamber being surmounted by said heating zone, in direct communication with the lower end of said heat exchange tubes; pump means horizontally disposed within said liquid receiving chamber for the circulation of liquid through said evaporator apparatus, partition means disposed within said liquid receiving chamber so as to form, within said liquid receiving chamber, a first section containing the intake side of said pump means and a second section containing the discharge side of said pump means, said partition means further being positioned such that the lower ends of a portion of the heat exchange tubes are in direct communication with only that section containing the intake side of the pump means and the lower ends of the remaining heat exchange tubes are in direct communication with only that section containing the discharge side of the pump means, and a second partition means disposed within said evaporating chamber and positioned so as to form, within said evaporating chamber, a first section in direct communication with the upper ends of those heat exchange tubes whose lower ends are in direct communication with the intake side of the pump means and a second section in direct communication with the upper ends of those heat exchange tubes whose lower ends are in direct communication with the discharge side of the pump means, said second partition means being formed so as to prevent liquid flow between said sections in the evaporating chamber at a point immediately adjacent said heat exchange tubes while permitting liquid flow between said sections at a point removed from the upper ends of said heat exchange tubes, and further being positioned so that it is not above the level of the liquid in the evaporation chamber.

More specifically, in the practice of the present invention, the evaporation apparatus of the present invention is constructed so that the liquid receiving chamber, heating zone, and evaporating chamber are formed as an integral unit. In this manner, the evaporating chamber, heating zone and liquid receiving chamber are disposed in a substantially vertical arrangement with the heating zone being positioned internally of the apparatus, rather than externally. Thus, the heating zone, which contains vertically disposed heat exchange tubes, is surmounted on the liquid receiving chamber, so that the lower ends of the heat exchange tubes are in direct communication with the liquid receiving chamber. Similarly, the evaporating chamber is surmounted on the heating zone so that it is in direct communication with the upper ends of the heat exchange tubes.

A pump means is horizontally disposed within the liquid receiving chamber and partition members are disposed within both the liquid receiving chamber and the evaporating chamber, so as to form two sections within each of these chambers. Within the liquid receiving chamber, the partition means are positioned, with respect to the pump means, so that the intake side of the pump is in one of the sections formed by the partition and the discharge side of the pump is in the other section. Further, the partition means is positioned so as not only to form these two sections within the liquid receiving chamber but also so as to separate the lower ends of the vertically disposed heat exchange tubes into two groups, one of which is in direct communication with only that section containing the intake side of the pump while the others are in direct communication with only that section containing the discharge side.

Similarly, the partition member in the evaporating chamber likewise is positioned so as to divide the upper ends of the vertically disposed heat exchange tubes into two groups. The one group is of those tubes whose lower ends are in communication with the intake side of the pump while the other group is of those whose lower ends are in direct communication with the discharge side of the pump, in the liquid receiving chamber. This partition means in the evaporating chamber is further positioned so that it is below the level of the liquid in the evaporating chamber.

In this manner, the solution being processed, such as an aqueous sodium hydroxide-sodium chloride solutions, is introduced into the liquid receiving chamber in the section containing the discharge side of the pump member, from which it is forced upwardly through the vertical heat exchange tubes whose lower ends are in direct communication with this section, into that section of the evaporating chamber which is in direct communication with the upper ends of these heating tubes. In the evaporating chamber, a portion of the water of the solution is flashed off, as steam, the solution overflowing the partition member into the second section of the evaporating chamber. From this section, the solution flows downwardly through those heat exchange tubes whose upper ends are in direct communication with this section, to the section of the liquid receiving chamber which contains the intake side of the pump member. From the intake side of the pump, the solution passes through the pump to the discharge side and the flow cycle is repeated to achieve the desired concentration of the solution, by evaporation.

Referring now to the drawings, in FIG. 1 there is shown a vertical section of an evaporator apparatus, embodied within the present invention, having a lower, liquid receiving chamber 1, which chamber is surmounted by an intermediate heating zone 3, which heating zones is surrmounted by an evaporating chamber 5. Within the liquid receiving chamber 1, partition means 7 is disposed so as to separate the liquid receiving chamber into two sections 15 and 17. A pump means 9 is horizontally mounted within the liquid receiving chamber so that its intake side is in section 15 and its discharge side is in section 17. An inlet 27, in section 17 is provided for the materials to be processed and an outlet 29, from section 15, is provided for recovery of the more concentrated solutions.

The heating zone 3 is surrmounted on the liquid receiving chamber 1 and contains a plurality of vertically disposed heat exchange tubes 11, the lower ends of which are in direct communication with the liquid receiving chamber. The partition means 7 is positioned within the liquid receiving chambers so that the lower ends of a portion of the heat exchange tubes 11 are in direct communication with only the section 17, which contains the discharge side of the pump 9, while the lower ends of the remainder of the heat exchange tubes 11 are in direct communication with only section 15, which contains the intake side of the pump 9. Additionally, there is provided an inlet 31 for the introduction of steam or other heat exchange media into the heating zone, as well as an outlet 33 for the removal of the heat exchange media from the heating zone.

Surmounted on the heating zone 3 is an evaporating chamber 5. As is shown, the lower portion of the evaporator chamber 5 contains a liquid, while the upper portion 23, contains the vapors which are flashed off from the heated liquid in the bottom portion of the chamber. A mesh-type entrainment separator, 25, is positioned in the upper portion of the evaporation chamber to effect the separation of any entrained liquids from the vapors, the vapors passing through the separator 25 to the outlet 35 through which they are removed from the evaporation chamber. A partition member 13, is positioned in the lower portion of the evaporating chamber to separate it into two sections, 19 and 21. This partition is further positioned so that the upper ends of a portion of the heat exchange tubes 11 are in direct communication only with section 19, while the upper ends of the remainder of the heat exchange tubes are in direct communication only with section 21. These heat exchange tubes which are in direct communication with section 21 are those whose lower ends are in direct communication with section 15 of the liquid receiving chamber while those tubes in direct communication with section 19 in the evaporating chamber are those whose lower ends are in direct communication only with section 17 of the liquid receiving chamber. The partition member 13 is further disposed within the evaporating chamber 5 so that it is not above the level of the liquid in the lower portion of the evaporating chamber.

Figure 2:
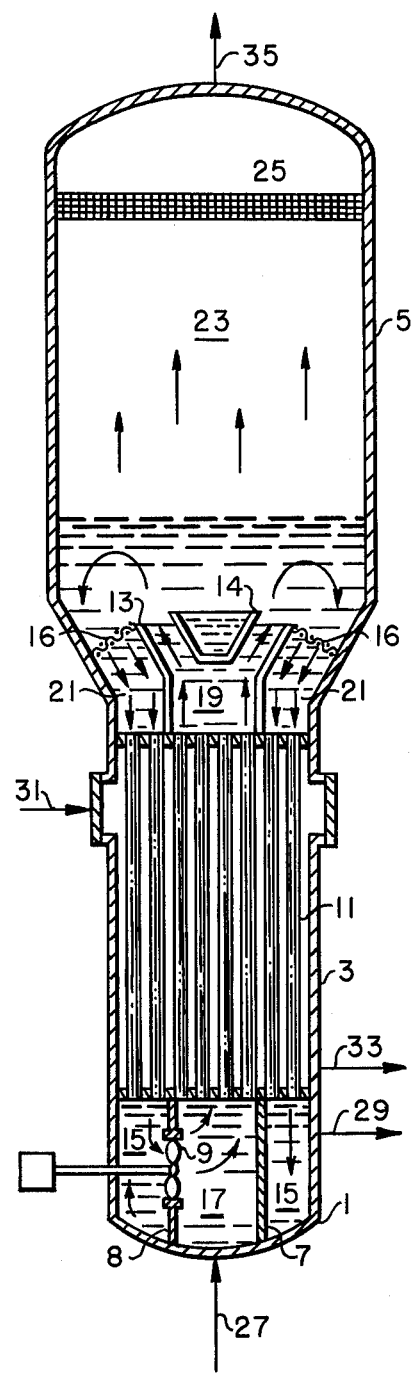
FIG. 2 is a vertical section of an alternative embodiment of the evaporator of the present invention.

Referring now to FIG. 2, this illustrates another embodiment of the evaporator apparatus of the present invention, having a modified form of the partition means in both the liquid receiving chamber and the evaporating chamber. In this embodiment, as in that shown in FIG. 1, the liquid receiving chamber 1, the heating zone 3 and the evaporating chamber 5 are formed as an integral unit, with the heating zone surmounted on the receiving chamber and the evaporating chamber surmounted on the heating zone. Within the liquid receiving chamber 1, cylindrical partition member 7 is positioned so as to define a centrally disposed inner chamber 17 and an outer chamber 15 concentrically disposed around the inner chamber. In one portion, 8, of the partition member 7 a pump means 9 is horizontally mounted so that the intake side of the pump is in the outer chamber 15 and the discharge side of the pump is in the inner chamber 17. The partition member 7 is further positioned so that the lower ends of those heat exchange tubes 11 which are in the central portion of the heating zone 3 are in direct communication with only the inner section 17 while the lower ends of those heating tubes which are in the outer, peripheral portion of the heating zone are in direct communication with only the outer section 15 of the liquid receiving chamber.

In the evaporating chamber 5, a funnel shaped partition member 13 is positioned so as to form a central, inner chamber 19 and an outer chamber 21, concentrically disposed around the inner chamber. This outer chamber 21 is in direct communication with the upper end of those heat exchange tubes whose lower ends are in direct communication with section 15 of the liquid receiving chamber while chamber 19 in the evaporating chamber is in direct communication with the upper ends of those heat exchange tubes whose lower ends are in direct communication with section 17 in the liquid receiving chamber. Additionally, a conical shaped member 14 is disposed within the upper portion of the partition member 19, and spaced apart therefrom. The member 14 acts, in conjunction with partition member 19 to aid in the distribution of the flow of the solution being processed into the evaporating chamber 5. Screen member 16 may also be positioned between the top of the partition 19 and the outer wall of the evaporation chamber 5. This screen member serves to prevent lumps or other solid particles which may crystallize in the solution from being passed downwardly through the heat exchange tubes where they may cause plugging of the tubes. As with the embodiment shown in FIG. 1, the partition and distribution members 13 and 14 are positioned in the lower portion of the evaporating chamber such that they are not above the level of the liquid in the chamber.

Figure 3:
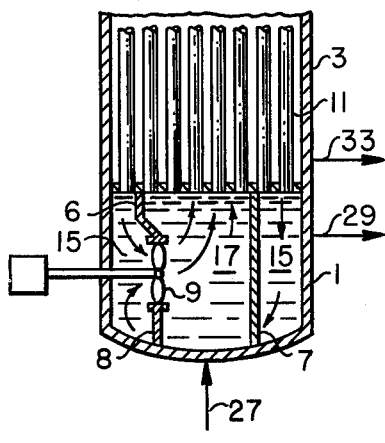
FIGS. 3 and 5 are vertical sections of the lower portion of an evaporator of the present invention showing alternative embodiments for the liquid receiving chamber and pumping means.

In a further modification of the liquid receiving chamber, as is shown in FIG. 3, the partition member 17 is formed with an inwardly offset portion 6 at the point 8 where the pump 9 is horizontally mounted. In this manner, the chamber 15 is formed with an enlarged portion immediately adjacent the intake side of the pump 9 which facilitates the delivery and flow of the solution to the pump.

Figure 4:
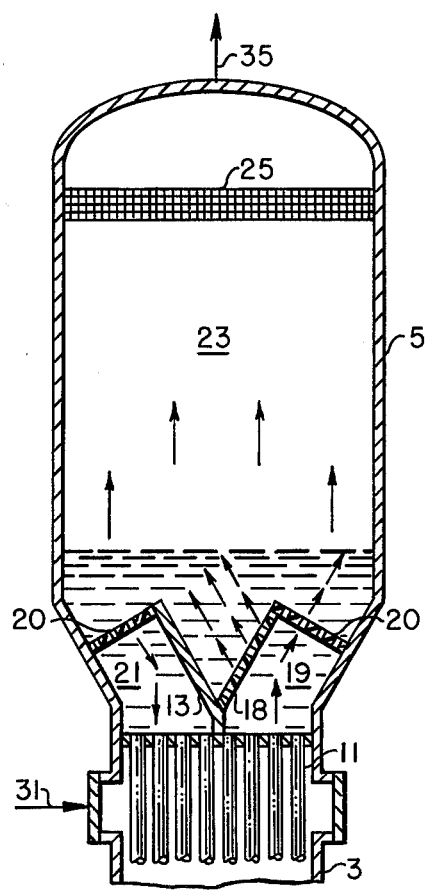
FIG. 4 is a vertical section of the upper portion of an evaporator of the present invention showing an alternative embodiment for the liquid distribution means.

In FIG. 4, there is shown a further modification of the partition and distribution means in the evaporating chamber of the apparatus. In this embodiment, the partition member 13 is positioned so as to form the sections 19 and 21 within the lower portions of the evaporating chamber which sections or chambers are, respectively, in direct communication with the upper ends of only a portion of the heat exchange tubes 11. In this embodiment, the partition 13 is formed with a perforated member 18 which forms, with the partition member 13 a V-shaped partition-distribution means, which is disposed beneath the surface of the liquid in the evaporating chamber. Additionally, as in the embodiment shown in FIG. 2, perforated plate or screen members 20 are also provided which permit the flow of solution, while preventing lumps or other crystallized materials to be drawn back into the heat exchange tubes in communication with section 21 of the evaporating chamber. This configuration may, of course, be used in conjunction with any of the liquid receiving chambers as shown in FIGS. 1, 2, 3 and 5.

Figure 5:
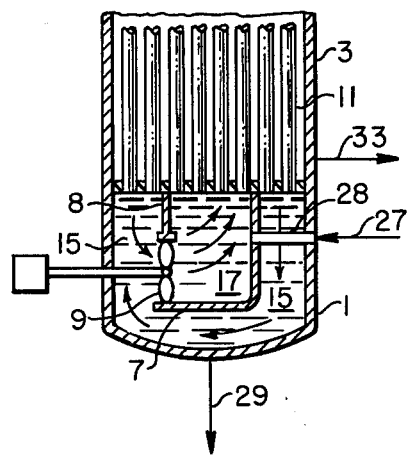

In FIG. 5, there is shown a further modification of the liquid receiving chamber of the evaporator apparatus of the present invention. In this embodiment, the cylindrically shaped partition member 7 is formed with a bottom portion which is spaced apart from the bottom of the liquid receiving chamber, thus permitting the section 15, which contains the intake side of the pump 9, to extend along the bottom portion of the liquid receiving chamber, as well as around the side. Additionally, a conduit is provided between the outer walls of the liquid receiving chamber 1, through partition 7, into section 17 so that the solutions to be processed may be introduced through inlet 27 to the discharge side of pump 9 in section 17 for circulation upwardly through the heat exchange tubes 11, into the evaporating chamber 5.

It has been found that by forming the present evaporator as an integral, vertical unit, simplification and economy in both construction and operation are realized. Moreover, by mounting the pump means horizontally within the liquid receiving chamber, it is found that not only are efficiencies in construction and operation obtained, but additionally, a versatility in operation is further realized which has not heretofore been the case. Thus, as a result of the horizontal mounting, the pump may be run efficiently in either direction, thus making it possible to back wash the heat exchange tubes to remove lumps or other obstructions, should this be desirable. Moreover, by mounting the partition and distribution means in the evaporation chamber so that it is not above the surface of the liquid in the chamber, a more effective and efficient distribution and evaporation of the solution in the chamber is obtained.

It is to be appreciated that although various specific embodiments of the evaporator apparatus of the present invention have been described hereinabove, various modifications and combinations of these specific features may be utilized without departing from the spirit of the present invention. Thus, for example, although the heating zone has been shown as being formed of a plurality of heat exchange tubes having a relatively small diameter, that portion of the heat exchange tubes which returns the solution being processed to the liquid receiving chamber may be formed as a single, large diameter pipe or conduit. In the most preferred embodiment, however, a plurality of smaller tubes will be used, as has been illustrated, in order to obtain the maximum heat transfer efficiency, both during the transfer of the solutions from the liquid receiving chamber to the evaporating chamber and in the return of the solutions to the liquid receiving chamber.

The evaporator apparatus of the present invention may be formed of any suitable materials which will withstand the temperature, pressure and corrosion conditions to which it will be subjected during use. Typically, such evaporator apparatus have heretofore been formed to a great extent from nickel, and such material may be used for the present evaporators. Preferably, however, those portions of the evaporator apparatus which have heretofore been formed of nickel are formed of a ferritic stainless steel, which is substantially free of nickel, identified as "E-Brite", and sold by the Airco Company. The use of this material to form evaporator apparatus is described more fully in a copending application Ser. No. 420,357 filed Nov. 29, 1973 (Case No. 3319).

The evaporator apparatus of the present invention may be used for the evaporation, concentration and/or purification of numerous materials, although it is particularly adaptive for uses in which crystallization takes places during the processing. In this regard, it is found to be particularly useful in the evaporation of sodium hydroxide solutions containing sodium chloride, such as the catholyte liquor obtained from an electrolytic diaphragm cell. As is known in the art, such solutions typically contain from about 8 to 14% by weight sodium hydroxide, up to about 18% by weight sodium chloride and up to about 0.05% by weight sodium chlorate. The present evaporator may be used for these and other solutions as the evaporator apparatus in either a single effect evaporation or as the evaporator apparatus in one or more of the effects of a multiple effect evaporation system.

While there have been described various embodiments of the present invention, it is to be understood that the specific materials, methods and configurations referred to are merely exemplary of the present invention and the manner in which it may be practiced, it being intended to cover the invention broadly in whatever form its principle may be utilized.

What is claimed is:

1. An integral forced circulation evaporation apparatus which comprises an evaporating chamber having a lower liquid space region containing heated liquid and an upper vapor space region containing vapors flashed off from the heated liquid in the lower liquid space region, a heating zone containing vertically disposed heat exchange tubes, and a liquid receiving chamber, said lower liquid space region of the evaporating chamber being surmounted on said heating zone in direct communication with the upper ends of each of said heat exchange tubes, said liquid receiving chamber being surmounted by said heating zone in direct communication with the lower ends of said heat exchange tubes;

pump means disposed within said liquid receiving chamber for the circulation of liquid through said evaporator apparatus, partition means disposed wihin said liquid receiving chamber so as to form, within said liquid receiving chamber, a first section containing the intake side of said pump means and a second section containing the discharge side of said pump means, said partition means further being positioned such that the lower ends of a portion of the heat exchange tubes are in direct communication with only that section containing the intake side of the pump means and the lower ends of the remaining heat exchange tube having direct communication with only that section containing the discharge side of the pump means, and a second partition means disposed within said lower liquid space region of the evaporating chamber positioned so as to form within said evaporating chamber, a first section in direct communication with the upper ends of those heat exchange tubes whose lower ends are in direct communication with the intake side of the pump means and a second section in direct communication with the upper ends of those heat exchange tubes whose lower ends are in direct communication with the discharge side of the pump means, said second partition means being formed so as to prevent liquid flow between said sections in the evaporating chamber at a point immediately adjacent the upper ends of said heat exchange tubes while permitting liquid flow between said sections in the evaporating chamber at a point above the upper end of said second partition means, and further being positioned so that it is below the level of the liquid in the lower liquid space region of the evaporating chamber, said second partition means being substantially funnel shaped and disposed in the lower liquid space region of said evaporating chamber and positioned in the central part thereof so as to form a central, inner section, and an outer section surrounding said inner section, and a conically shaped member disposed within the upper portion of said second partition means, and spaced apart therefrom, so as to form an annular channel for the distribution of liquid flow.

2. The evaporation apparatus of claim 1 wherein the first partition means in the liquid receiving chamber is offset in a direction toward the inner section of said liquid receiving chamber in the area in which the pump means is mounted.

3. An integral forced circulation evaporation apparatus which comprises an evaporating chamber having a lower liquid space region containing heated liquid and an upper vapor space region containing vapors flashed off from the heated liquid in the lower liquid space region, a heating zone containing vertically disposed heat exchange tubes, and a liquid receiving chamber, said lower liquid space region of the evaporating chamber being surmounted on said heating zone in direct communication with the upper ends of each of said heat exchange tubes, said liquid receiving chamber being surmounted by said heating zone in direct communication with the lower ends of said heat exchange tubes; pump means disposed within said liquid receiving chamber for the circulation of liquid through said evaporator apparatus, partition means disposed within said liquid receiving chamber so as to form, within said liquid receiving chamber a first section containing the intake side of said pump means and a second section containing the discharge side of said pump means, said partition means further being positioned such that the lower ends of a portion of the heat exchange tubes are in direct communication with only that section containing the intake side of the pump means and the lower ends of the remaining heat exchange tube having direct communication with only that section containing the discharge side of the pump means, and a second partition means disposed within said lower liquid space region of the evaporating chamber positioned so as to form within said evaporating chamber, a first section in direct communication with the upper ends of those heat exchange tubes whose lower ends are in direct communication with the intake side of the pump means and a second section in direct communication with the upper ends of those heat exchange tubes whose lower ends are in direct communication with the discharge side of the pump means, said second partition means being formed so as to prevent liquid flow between said sections in the evaporating chamber at a point immediately adjacent the upper ends of said heat exchange tubes while permitting liquid flow between said sections in the evaporating chamber at a point above the upper end of said second partition means and further being positioned so that it is below the level of the liquid in the lower liquid space region of the evaporating chamber, said second partition means being substantially funnel shaped and disposed in the lower liquid space region of said evaporating chamber and positioned in the central part thereof so as to form a central, inner section, and an outer section surrounding said inner section the outer section having screen members extended from the funnel shaped member to the outer walls of the evaporation chamber.

4. The evaporation apparatus as claimed in claim 3 wherein the partition member in the liquid receiving chamber is offset in a direction toward the inner section of said liquid receiving chamber in the area in which the pump means is mounted.

5. An integral forced circulation evaporation apparatus which comprises an evaporating chamber having a lower liquid space region containing heated liquid and an upper vapor space region containing vapors flashed off from the heated liquid in the lower space region, a heating zone containing vertically disposed heat exchange tubes, and a liquid receiving chamber, said lower liquid space region of the evaporating chamber being surmounted on said heating zone in direct communication with the upper ends of each of said heat exchange tubes, said liquid receiving chamber being surmounted by said heating zone in direct communication with the lower ends of said heat exchange tubes; pump means disposed within said liquid receiving chamber for the circulation of liquid through said evaporator apparatus, partition means disposed within said liquid receiving chamber so as to form, within said liquid receiving chamber a first section containing the intake side of said pump means and a second sectioncontaining the discharge side of said pump means, said partition means further being positioned such that the lower ends of a portion of the heat exchange tubes are in direct communication with only that section containing the intake side of the pump means and the lower ends of the remaining heat exchange tube having direct communication with only that section containing the discharge side of the pump means, and a second partition means disposed within said lower liquid space region of the evaporating chamber positioned so as to form within said evaporating chamber, a first section in direct communication with the upper ends of those heat exchange tubes whose lower ends are in direct communication with the intake side of the pump means and a second section in direct communication with the upper ends of those heat exchange tubes whose lower ends are in direct communication with the discharge side of the pump means, said second partition means being formed so as to prevent liquid flow between said sections in the evaporating chamber at a point immediately adjacent the upper ends of said heat exchange tubes while permitting liquid flow between said sections in the evaporating chamber at a point removed above the upper end of said second partition means and further being positioned so that it is below the level of the liquid in the lower liquid space region of the evaporating chamber, said second partition means being substantially funnel shaped and disposed in the lower space region of said evaporating chamber and positioned in the central part thereof so as to form a central, inner section, and an outer section surrounding said inner section, said outer section having screen members extended from the funnel shaped member to the outer walls of the evaporation chamber, and a conically shaped member is disposed within the upper portion of said second partition means, and spaced apart therefrom, so as to form an annular channel for the distribution of liquid flow.

* * * * *